May 17, 1927.

K. S. JOHNSON

ELECTRICAL NETWORK

Filed July 9, 1923     3 Sheets-Sheet 1

Inventor:
Kenneth S. Johnson,
by  Joel C. L. Palmer Atty

May 17, 1927.  K. S. JOHNSON  1,628,983
ELECTRICAL NETWORK
Filed July 9, 1923   3 Sheets-Sheet 2

Inventor:
Kenneth S. Johnson,
by Joel R. Palmer   Att'y

May 17, 1927.    K. S. JOHNSON    1,628,983

ELECTRICAL NETWORK

Filed July 9, 1923    3 Sheets-Sheet 3

Inventor:
Kenneth S. Johnson,
by Joel C. R. Palmer Atty

Patented May 17, 1927.

1,628,983

UNITED STATES PATENT OFFICE.

KENNETH S. JOHNSON, OF JERSEY CITY, NEW JERSEY, ASSIGNOR TO WESTERN ELECTRIC COMPANY, INCORPORATED, OF NEW YORK, N. Y., A CORPORATION OF NEW YORK.

ELECTRICAL NETWORK.

Application filed July 9, 1923. Serial No. 650,288.

This invention relates to electric current transmission, and aims to transmit efficiently currents of selected frequencies, especially between circuits having different impedances.

In accordance with the invention the essential functions of ordinary impedance step up or step down transformers are accomplished, for currents of selected frequencies, by various types of networks, as for instance reactance net works of T, π, L, or Wheatstone bridge type. The reactances of the arms of the networks need not in all cases depend upon the ratio of the terminal impedances between which the network is operating, as in the case of an ordinary transformer; but may in certain of the networks, for instance, depend only upon the product of the terminal impedances; or may in the case of others of the networks, depend upon both the ratio and the product of the terminal impedances. Some of the networks involve the use of only one (two terminal) coil, while others involve the use of two coils—or one coil with three terminals. Some of the networks, moreover, permit direct current to pass through them, whereas others of the net works do not. The networks are applicable to various uses, and especially to signaling or to carrier current work or the like where it is desired to efficiently transmit between two impedances a single frequency or only a relatively narrow band of frequencies, for instance a band having its upper limiting frequency several percent greater and its lower limiting frequency several percent less than the mean frequency of the band.

Figure 1:
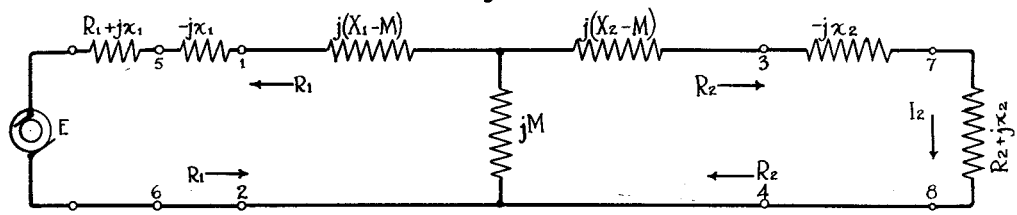
Figure 2:
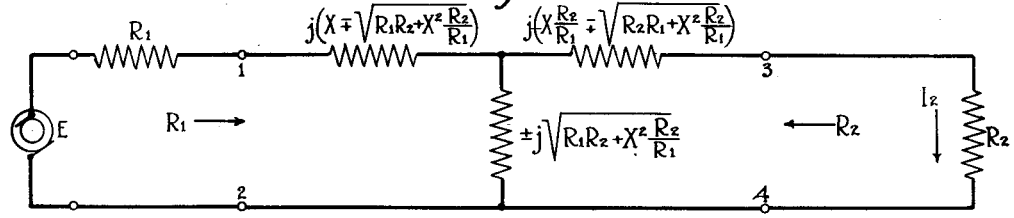
Figure 3:
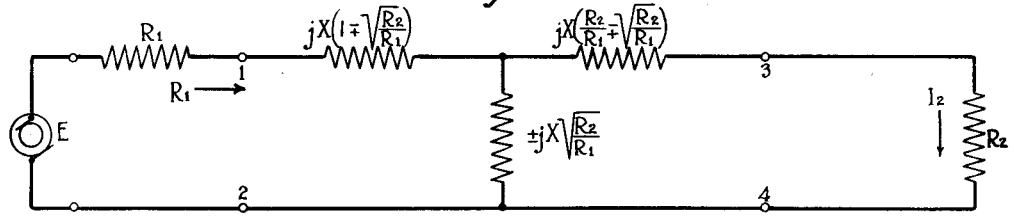

In the accompanying drawings, Fig. 1 is a circuit diagram for facilitating explanation of the application of the invention to the connecting of impedances which may have different phase angles: Fig. 2 is a diagram indicating in a general way relative impedance values that may be employed in the arms of a T network for efficiently transmitting currents between terminal impedances, and which network may under certain conditions constitute an embodiment of the invention; Fig. 3 is a diagram showing, for the sake of comparison, a special case of the circuit of Fig. 2, this special case representing the well known equivalent T network of the ordinary type of transformer structure; and the remaining figures indicate various networks which will be constituted in accordance with the invention when their impedances are given proper values as indicated hereinafter in connection with the drawings.

The expression "passive network" is used hereinafter to indicate a network which when functioning in a circuit does not introduce power or energy into the circuit as would, for instance, an amplifier.

The expression "ideal transducer" will be used hereinafter to indicate a passive network for connecting the sending end impedance and the receiving end impedance of a circuit, the network being of such nature that the absolute maximum possible power will be absorbed in the receiving end impedance. The absolute maximum power that can possibly be drawn from any circuit or source of electromotive force is the power drawn when the source is connected to a receiving impedance which is the conjugate of the impedance looking toward the source of E. M. F., and this power is the square of the E. M. F. divided by four times the effective resistance of the source. It is, of course, assumed that the change produced in the magnitude of the currents by the insertion of the network does not affect the constants of the line or the magnitude of the E. M. F. acting in the source.

The "transition loss" at any point in a circuit is considered hereinafter as represented by the gain in the transmission efficiency of the circuit which would result from the insertion, at that point, of an ideal transducer.

The expression "ideal transformer" is used hereinafter to indicate a transformer which neither stores nor dissipates energy, the primary and the secondary self impedances being infinitely great pure reactances and the mutual impedance being equal to the square root of the product of the self impedances. In such a transformer there is, of course, no flux leakage nor capacity, nor magnetizing current, and there are, of course, no core nor copper losses. The "best ratio", or "proper ratio" signifies hereinafter a ratio of the self impedances which is equal to the ratio of the numerical or absolute values of the impedances that face the point where the transformer is to be inserted.

The "transformer loss" at any point in a circuit is considered hereinafter to be represented by the gain in the transmission efficiency of the circuit which would result from the insertion of an ideal transformer of the proper ratio at that point.

For the sake of simplicity, the invention is explained hereinafter with reference particularly to the case in which the terminal impedances between which efficient transmission is to be effected are pure resistances, or in other words, to the case in which the reactance of each terminal impedance has been annulled by inserting an equal reactance of opposite sign in series with that impedance. It will be clear that the invention is of general application in connecting transmitting impedances and receiving impedances of any phase angles, for if we have given a circuit whose sending end impedance is $R_1 + jx_1$ and whose receiving end impedance is $R_2 + jx_2$ we will be connecting these impedances by an ideal transducer if we first annul the reactances $jx_1$ and $jx_2$ of the terminal impedances by the insertion of equal negative reactances $-jx_1$ and $-jx_2$ in series with them as shown in Fig. 1 and then insert (between the terminals 1—2 and 3—4) a network, for instance a properly constituted T network, that is equivalent to that of an ideal transformer of the proper ratio. In other words, under such conditions the maximum possible energy $$\left(\frac{E_2}{4R_1}\right)$$

will be absorbed in the receiving end impedance.

If in Fig. 1 there is to be no transition loss either at the junction 1—2 or at the junction 3—4, we must have the relations $$R_1 = j(X_1 - M) + \frac{jM[R_2 + j(X_2 - M)]}{R_2 + jX_2} \quad (1)$$

$$R_2 = j(X_2 - M) + \frac{jM[R_1 + j(X_1 - M)]}{R_1 + jX_1} \quad (2)$$

From equation (1) we derive the relations:

$$\frac{R_1}{R_2} = \frac{X_1}{X_2} \quad (3)$$

and $$M^2 = X_1 X_2 + R_1 R_2 \quad (4)*$$

These latter relations give us the T network shown in Fig. 2, which represents an ideal transducer when working between pure resistance terminal impedances—in so far as the value of $|I_2|$ is concerned.

In the network shown in Fig. 2 between the terminals 1—2 and 3—4, $jX$ is a variable pure reactance that may arbitrarily be given any desired value between zero and infinity without affecting the value of $|I_2|$. If X is infinitely large, we have the T network of the ordinary well known type of transformer, as shown for convenience of comparison in Fig. 3. Under this condition the make up of the arms of the T network is merely dependent upon the ratio $\frac{R_2}{R_1}$, and $I_2$ is either 0° or 180° out of phase with E.

Figure 4:
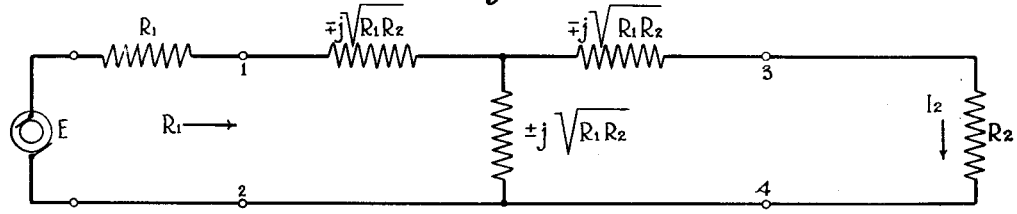

If we assume the variable X to be 0, we find that the arms of the T network are a function merely of the product of $R_1$ and $R_2$ (instead of being a function of their ratio as in the preceding case), the network reducing to that shown in Fig. 4. In this case $I_2$ is ± 90° out of phase with E.

Figure 5:
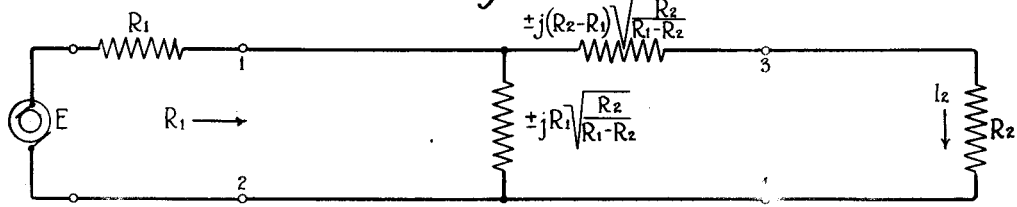

As a third case, if we let $$X^2 = R_1 R_2 + X^2 \frac{R_2}{R_1}$$

the left arm of the genral type of T network becomes zero and the structure then reduces to the two arm or L type of network shown in Fig. 5. In this case the make up of the ideal transducer is seen to depend both upon the ratio and upon the product of $R_1$ and $R_2$, and $I_2$ is, in general between 0° and ±90° or between ±90° and ±180° out of phase with E, depending upon the relative magnitude of $R_1$ and $R_2$.

From Fig. 5 it will be seen that there can always be made up an ideal transducer out of not more than four reactances, two of which, $-jx_1$, and $-jx_2$, may be used to annul the reactances $jx_1$ and $jx_2$ of the terminal impedances and the other two (as shown in the L network of Fig. 5) to function as the equvalent of an ideal transformer of the proper ratio, in so far as the magnitude of $I_2$ is concerned.

It should be understood that in choosing (as in Figs. 1 and 2) a type of network on which to base, or for which to develop, general expressions for the impedance values of the network arms requisite to make the network the equivalent of an ideal transformer, the T type has been selected merely as one example of known type of networks equivalent to the transformer, and that others of such known types can be similarly treated; for, as is shown in G. A. Campbell's paper on "Cissoidal oscillations" (Transactions of the A. I. E. E., Vol. XXX, Part II, page 873) any circuit, no matter how complex its structure, may at any frequency be reduced—in so far as its external action is concerned—to a simple network, (such as a T or "π") having only three parameters.

Returning now to consider further the T network of Fig. 4, the correctness of the impedance values obtained above for the network arms may be checked, and convenient design equations for T networks functioning as ideal transformers may be developed, in the manner indicated below.

Figure 6:
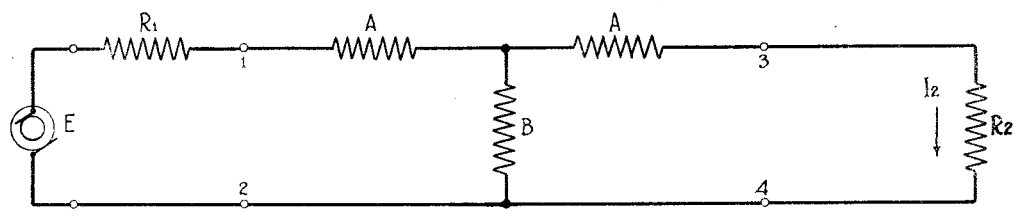

Fig. 6 shows a T network having series arms A, A and a shunt arm B, connected between a receiving impedance $R_2$ and a transmitting impedance $R_1$, having therein a source of e. m. f. E. Applying Kirchhoff's laws to this circuit, we derive the relation:

$$I_2 = \frac{EB}{(A+B)(A+R_2+R_1)+R_2R_1+AB} \quad (5)$$

where $I_2$ is the current in $R_2$:
if:

$$A+B=0 \text{ or } A=-B \quad (6)$$

we get:

$$I_2 = \frac{EB}{R_2R_1+AB} = \frac{EB}{R_2R_1-B^2} \quad (7)$$

Furthermore, if:

$$-A^2 = -B^2 = R_2R_1 \quad (8)$$

we have:

$$|I_2| = \frac{E}{2\sqrt{R_1R_2}} \quad (9)$$

which is the current that would flow in $R_2$ if an ideal transformer of the proper ratio were connected between the impedances $R_1$ and $R_2$.

Figure 7:
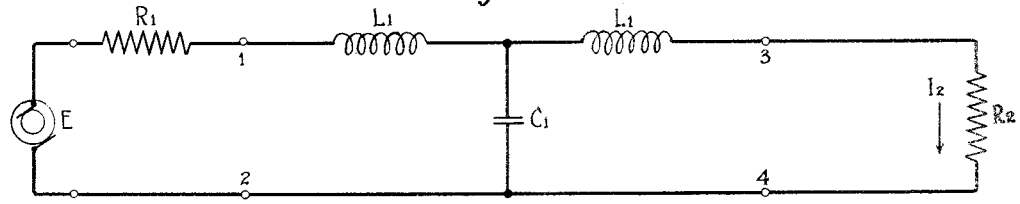
Figure 8:
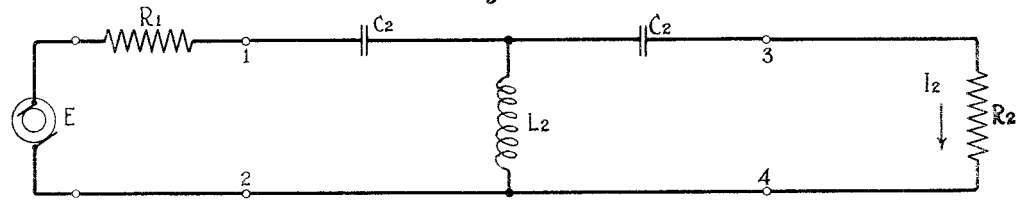

In the circuits shown in Figs. 7 and 8, which correspond to the circuit of Fig. 6 except that inductance $L_1$ and $L_2$ and capacities $C_1$ and $C_2$ have been substituted for A and B, equation (6) will be satisfied for any frequency at which $$L_1C_1W^2 = 1 \text{ or } L_2C_2W^2 = 1 \quad (10)$$

(W being 2$\pi$ times the frequency in cycles per second), and equation (8) will be satisfied if:

$$L_1^2W^2 = \frac{1}{C_1^2W^2} = R_2R_1 \text{ or } L_2^2W^2 = R_2R_1 = \frac{1}{C_2^2W^2} \quad (11)$$

The two preceding equations may be rewritten so as to give the following convenient design equations:

$$C_1 = \frac{1}{W\sqrt{R_2R_1}} \text{ and } L_2 = \frac{\sqrt{R_2R_1}}{W} \quad (12)$$

$$L_1 = \frac{\sqrt{R_2R_1}}{W} \text{ and } C_2 = \frac{1}{W\sqrt{R_2R_1}} \quad (13)$$

When the above design equations have been fulfilled the current flowing in $R_2$ is as given by equation (9)—, or is the same as if an ideal transformer of the proper ratio were connected between the two terminal impedances. It is to be noted that, as pointed out above, the ratio of the terminal impedances $R_1$ and $R_2$ does not affect the design of this T network—the product of those impedances being the only factor, except the frequency, that enters into the design.

It is interesting to note that in Fig. 8 we have a structure which employs only one winding and yet which has the characteristics of an ideal transformer, for a selected frequency. This type of structure prevents the flow of direct current therethrough, whereas the structure of the type shown in Fig. 7 permits the passage of D. C.

Figure 9:
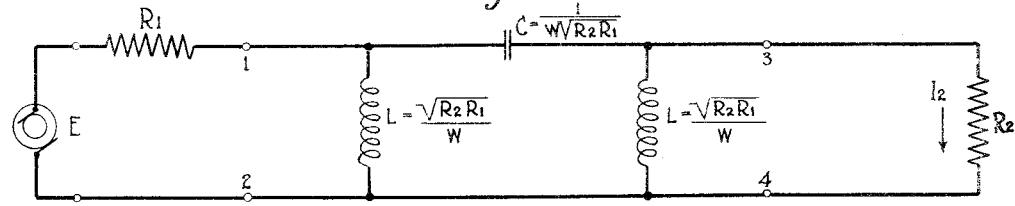
Figure 10:
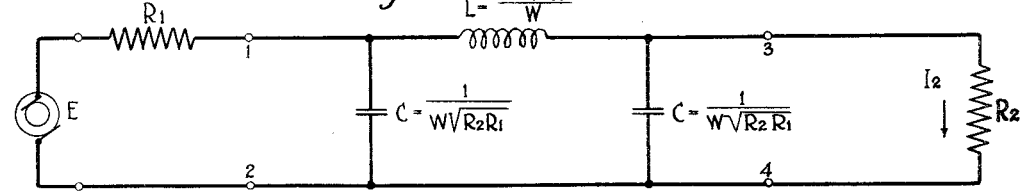

A network constituted as indicated in Fig. 9 or Fig. 10 will function in exactly the same way as the T network of Figs. 7 or 8, respectively, to give the same current in $R_2$ at the frequency $$F = \frac{W}{2\pi},$$

as would an ideal transformer.

Figure 11:
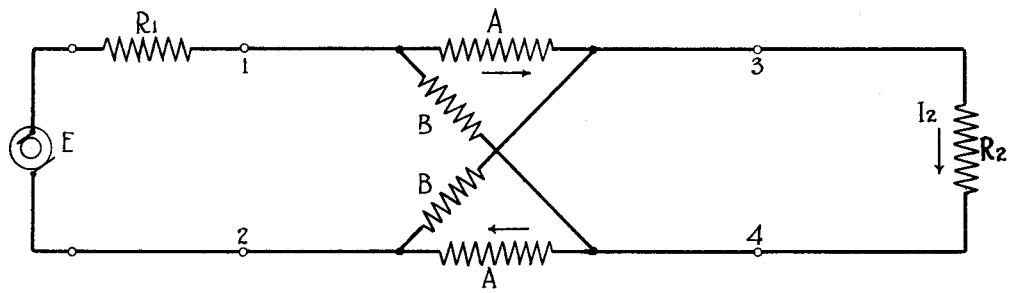

Moreover, the functions performed by these series-shunt types of structure can also be performed by properly constituted Wheatstone bridge types of structure, design formulas for which will now be derived. In Fig. 11, a Wheatstone bridge is formed of two impedance arms A, A and two impedance arms B, B, terminal impedances $R_1$ and $R_2$ being connected respectively across the pairs of diagonal terminals of the bridge, the figure showing two of the bridge arms crossed in order that the incoming and outgoing terminals may appear at the left and the right sides, respectively, of the bridge. Where arms of the bridge are designated herein as "opposite arms", they are a pair of bridge arms having no common terminals. It is assumed that there is a mutual inductance M between the two self impedances A, the circuit from 1 to 3 to 4 to 2 being the series aiding connection, as indicated by the arrows.

Applying Kirchhoff's laws we derive the following value for the current $I_2$ in the receiving impedance $R_2$, where E is the E. M. F. acting in the transmitting impedance $R_1$:

$$I_2 = \frac{E(B-M-A)}{[A+B+M][R_1+R_2]+2[B(A+M)+R_2R_1]} \quad (14)$$

If we let:
$$A+B+M=0 \text{ or } B+M=-A \quad (15)$$

we get
$$I_2 = \frac{EB}{R_1R_2-B^2} \quad (16)$$

If we furthermore let:
$$-B^2=-A^2=R_1R_2 \quad (17)$$

we have:
$$|I_2| = \frac{E}{2\sqrt{R_2R_1}} \quad (18)$$

which is the current that would flow in $R_2$ if an ideal transformer of the proper ratio were connected between the impedances $R_2$ and $R_1$.

Figure 12:
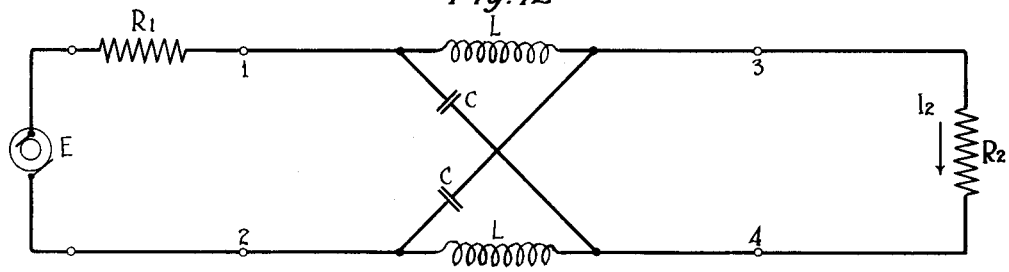

In order to fulfill approximately the conditions required by equations (15) and (17) let us consider the specific circuit shown in Fig. 12, which corresponds to the circuit of Fig. 10 except that inductances L and capacities C have been substituted for impedances A and B respectively. Assume a mutual inductance of value $m$ (KL) to exist between the two self inductances L. From our previous notation we then have:

$$A=jLW, \; B=\frac{-j}{CW}; \text{ and } M=jmW,=jKLW.$$

If equation (15) is to be satisfied, we have:

$$j\left(LW+KLW-\frac{1}{CW}\right)=0 \text{ or } LCW^2(1+K)=1 \quad (19)$$

K being the coefficient of coupling between the two coils.

Similarly, if equation (17) is to be satisfied, we have:
$$L^2W^2=R_2R_1 \quad (20)$$

Equations (19) and (20) give us the design equations:
$$L=\frac{R_2R_1}{W} \quad (21)$$

and
$$C=\frac{1}{(1+K)W\sqrt{R_2R_1}} \quad (22)$$

Figure 13:
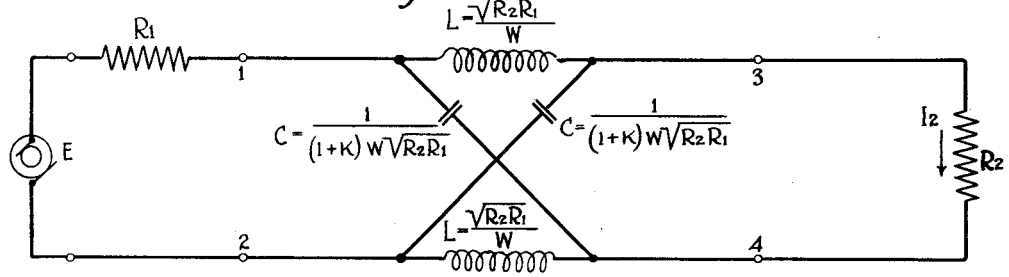

When, therefore, equations (21) and (22) have been satisfied, which is the same as satisfying equations (15) and (17) the received current $I_2$ will be as given in equation (18), viz:
$$|I_2|=\frac{E}{2\sqrt{R_2R_1}} \quad (23)$$

and we have the same received current at frequency
$$f=\frac{W}{2\pi},$$

as would be obtained by the use of an ideal transformer. A diagram of the bridge structure used as is indicated by the above formulae is given in Fig. 13, and shows that the values of the inductances and capacities in the bridge structure do not depend upon the ratio of the two impedances $\left(\frac{R_1}{R_2}\right)$ between which it is connected. The inductance and capacity values depend simply upon the product of the two terminal impedances ($R_2R_1$). In other words, the same identical structure would be used to step from 1000 ohms to 10 ohms as would be used to step from 316.2 ohms to 316.6 ohms—or as would be used to step from 100 ohms to 100 ohms.

The transmission losses in such a structure will depend (1) upon the ratio Q of the reactance to the resistance of the coils and (2) upon the frequency—although all frequencies from zero (or D. C.) up to infinity will pass through the structure. The losses in the structure will also depend upon the ratio of the impedances $\left(\frac{R_1}{R_2}\right)$ between which the structure is to work.

The following approximation formula has been found useful in determining the effect of the ratio Q of the reactance of the coils to their effective resistance as well as the effect of the ratio of the impedances between which the structure is going to work:

$$\text{"transformer loss"}=\frac{\left(\sqrt{\frac{R_1}{R_2}}+\sqrt{\frac{R_2}{R_1}}\right)(1+K)}{.4Q} \quad (24)$$

the loss being expressed in miles of standard cable (796 cycles).

It will be seen that the loss thus obtained is inversely proportional to Q, and when two coils so related that $K=o$ are used the loss is one-half of that obtained when only one coil is used—with a coefficient of coupling approximately unity.

The fact that the loss depends upon the frequency is in agreement with the fact that equations (19) and (20) or (21) and (22) can be satisfied at only one frequency.

In order to convey a quantitative idea of the effect of frequency upon the transmission efficiency of the structure in a particular case, for instance where:—

$$R_1 = 316.2 \text{ and } R_2 = 31.6 \text{ or } \frac{R_1}{R_2} = 10; \ W = 5000; \ Q = 100; \ K = 0;$$

and the values of L and C, determine from equations (21) and (22) by using therein a value of 5000 for W, and are .02 henry and 2 mf. respectively—it may be stated that the "transformer loss" in the bridge network has been found under these conditions, to vary approximately from .08 mile at the frequency $$\frac{W}{2\pi} = \frac{5000}{2\pi}$$

to .10 mile at frequencies 5% greater and less respectively. It will be noted that this total band width, 10%, is approximately the width of band employed on the average in carrier current work, and that the bridge network functions efficiently over the band width.

An analysis of the equation holding for the case of the structure shown in Fig. 7 shows that the "transformer loss" of the T network is given by the approximate formula:

$$\text{"transformer loss"} = \frac{10}{1 + \dfrac{2Q}{\sqrt{\dfrac{R_1}{R_2}} + \sqrt{\dfrac{R_2}{R_1}}}}$$

which is essentially the same as formula (24) for the bridge type of structure—in the case where K=1. These approximate formulæ hold, of course, only for a single frequency. The effect of a variation in frequency has been discussed briefly above, in connection with the bridge type of network, and is essentially the same in the case of the T or π networks as for the case of the bridge network.

Figure 14:
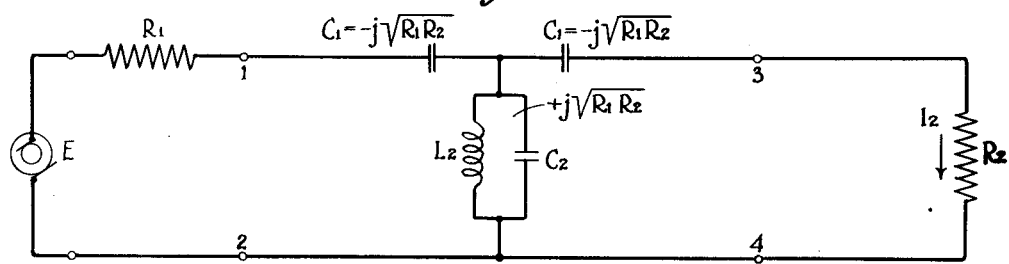

Among the various structural forms of networks which may be designed to function as an ideal transformer, the structural forms shown in Figs. 1 to 5 of Campbell Patent 1,227,114, May 22, 1917, may be specifically mentioned. For example, if it is desired to connect a sending impedance $R_1$ of 10 ohms with a receiving impedance $R_2$ of 1000 ohms through a network of the structural form of the band filter of Fig. 2 of the patent, in the manner indicated in Fig. 14 of the drawings accompanying this specification, and have the reactance network function as an ideal transformer at frequency $$f = \frac{W}{2\pi}$$

the impedance of each series arm of the network may be $$-j\sqrt{R_1 R_2}$$

and that of the shunt arm may be $$+j\sqrt{R_1 R_2},$$

as indicated by Fig. 4. That is, designating the capacity of each of the series elements of the network as $C_1$, and the capacity and inductance elements of the shunt arm as $C_2$ and $L_2$ respectively, we have for the value of the reactance of each series arm, $$-j\sqrt{(10)(1000)} = -j\,33.3 = -j\frac{1}{C_1 W}$$

whence $$C_1 = \frac{1}{33.3\,W}$$

and for the value of the reactance of the shunt arm $$+j\sqrt{(10)(1000)} = +j\,33.3 = \frac{\left(jL_2 W\right)\dfrac{1}{jC_2 W}}{jL_2 W + \dfrac{1}{jC_2 W}};$$

whence $$33.3 = \frac{L_2 W}{1 - L_2 C_2 W^2}$$

What is claimed is:

1. A network connection between a transmitting impedance of one absolute value and a receiving impedance of a different absolute value, said network having arms the impedance of each of which is such a function of the absolute values of said terminal impedances and of a single other finite quantity, which quantity is the same in the case of each arm, that said network is capable, when connected between said impedances, of presenting to each of said absolute impedances an absolute impedance equal thereto, at a given frequency.

2. A network for connection between a transmitting impedance of one absolute value and a receiving impedance of a different absolute value, said network having arms the impedance of each of which is such a function of the product of said absolute impedance values that the network is capable of transmitting current of a given frequency between said terminal impedances with substantially no transition loss at the junction of either terminal impedance with said network.

3. A network for connection between two terminal impedances, said network comprising two sets of impedance arms, each arm having the same absolute value of reactance at the frequency to be transmitted between said terminal impedances with maximum efficiency, and the reactances of the two sets of arms being opposite in sign.

4. A network for connection between two terminals, impedances to perform the essential functions of an ordinary impedance step up or step down transformer at a selected frequency, said network comprising two sets of impedance arms, each arm being a substantially pure reactance equal in value at the frequency to be transmitted with maximum efficiency to the square root of the product of the terminal impedances, and the reactance of the two sets of arms being opposite in sign.

5. A T network for connection between a sending impedance of value $R_1$ and a receiving impedance of value $R_2$, the series arms of said network being reactances $$j\left(X \pm \sqrt{R_1R_2 + X^2\frac{R_2}{R_1}}\right)$$

and $$j\left(X\frac{R_2}{R_1} \pm \sqrt{R_1R_2 + X^2\frac{R_2}{R_1}}\right)$$

respectively, and the shunt arm being $$\pm j\sqrt{R_1R_2 + X^2\frac{R_2}{R_1}},$$

X being less than infinity.

6. The combination with two terminal impedances, of a network for connecting said impedances, said network comprising series and shunt arms, each of said arms being a substantially pure reactance having an absolute value equal to the square root of the product of said terminal impedances, and the reactance of the shunt and series arms being opposite in sign.

7. The combination with two terminal impedances of a T network for transmitting a given frequency between said impedances without transition loss at the junction of said network with either of said impedances, each arm of said network being a substantially pure reactance having an absolute value equal to the square root of the product of said terminal impedances, and the reactances of the shunt and series arms of said network being opposite in sign.

8. The combination with two terminal impedances, of a network for transmitting a given frequency between said impedances, each arm of said network being a substantially pure reactance having an absolute value equal to the square root of the product of said terminal impedances, and the reactances of the shunt and series arms of said network being opposite in sign.

9. The combination with two terminal impedances of a network comprising series and shunt branches for transmitting waves of a given frequency between said impedances with a phase shift of substantially 90°, each branch of said network being a substantially pure reactance having an absolute value equal to the square root of the product of said terminal impedances and the reactances of the shunt and the series branches of said network being opposite in sign.

In witness whereof, I hereunto subscribe my name this 3 day of July A. D., 1923.

KENNETH S. JOHNSON.